United States Patent [19]

Klotz

[11] Patent Number: 5,137,624
[45] Date of Patent: Aug. 11, 1992

[54] BIDIRECTIONAL FILTER

[75] Inventor: James R. Klotz, Mt. Clemens, Mich.

[73] Assignee: Chrysler Corporation, Highland Park, Mich.

[21] Appl. No.: 554,771

[22] Filed: Jul. 19, 1990

[51] Int. Cl.⁵ .............................................. B01D 35/02
[52] U.S. Cl. .................... 210/171; 210/323.1; 210/335; 210/445; 210/451; 210/498; 210/499; 192/106 F
[58] Field of Search ............ 210/137, 168, 171, 323.1, 210/333.01, 335, 336, 339, 418, 432, 435, 445, 446, 451, 459, 463, 495, 498, 499; 55/482, 486, 525; 137/544, 545, 550; 138/41

[56] References Cited

U.S. PATENT DOCUMENTS

| | | | |
|---|---|---|---|
| 234,408 | 11/1880 | Jennings | 210/335 |
| 1,883,720 | 10/1932 | Grimes | 138/41 |
| 3,109,459 | 11/1963 | Lee, II et al. | 138/41 |
| 4,964,506 | 10/1990 | Benford et al. | 192/106 F |
| 4,982,826 | 1/1991 | Holbrook | 192/106 F |

Primary Examiner—Robert A. Dawson
Assistant Examiner—Matthew O. Savage
Attorney, Agent, or Firm—Mark P. Calcaterra

[57] ABSTRACT

The present invention is a filter assembly for filtering contaminants from first and second fluid sources. The filter assembly includes front and rear portions having front and rear apertures, respectively, extending therethrough. The filter assembly also includes a web portion for spacing longitudinally the front and rear portions and having a filter orifice extending therethrough for allowing fluid flow between the front and rear apertures. The front and rear portions include means forming a filter disposed in each of the front and rear apertures for filtering contaminants from fluid flowing through the front and rear apertures.

15 Claims, 2 Drawing Sheets

5,137,624

BIDIRECTIONAL FILTER

BACKGROUND OF THE INVENTION

1. Field of the Invention

The present invention relates to filters, and more particularly, to a filter for a fluid actuating device in an automatic transmission primarily intended for motor vehicle use.

2. Description of Related Art

A conventional transmission includes a hydrodynamic torque convertor to transfer engine torque from an engine crankshaft to a rotatable input member of the transmission through fluid-flow forces. The transmission includes frictional units which couple the rotatable input member to one or more members of a planetary gear set. Other frictional units, typically referred to as brakes, hold members of the planetary gear set stationary during flow of power. These frictional units are usually brake clutch assemblies or band brakes. The drive clutch assemblies can couple the rotating input member of the transmission to the desired elements of the planetary gear set, while the brakes hold elements of these gear sets stationary. Such transmission systems also typically provide for one or more fluid actuating devices such as a piston in order to engage and disengage the frictional units.

Automatic transmissions are designed to take automatic control of the frictional units, gear ratio selection and gear shifting. An example of such an automatic transmission is disclosed in copending patent application, Ser. No. 188,610, filed Apr. 29, 1988 now U.S. Pat. No. 4,964,506 and assigned to the assignee of the present application. In this automatic transmission, fluid actuating devices such as pressure balanced pistons are provided to prevent the centrifugal force acting on the rotating fluid in the clutch cavity from causing the piston to remain in a clutch apply position even though fluid apply line is vented. More specifically, the pressure balance pistons have an orifice to allow fluid to pass therethrough due to differential pressure.

One disadvantage with the above pressure balanced pistons is that if a filter is not provided in the orifice, the orifice may be plugged by contaminants in the transmission fluid. As a result, a need exists for providing a filter that is bidirectional for allowing fluid to pass therethrough.

It is, therefore, one object of the present invention to provide a bidirectional filter assembly for a pressure balanced piston.

It is another object of the present invention to provide a bidirectional filter assembly which can be used in various applications.

It is yet another object of the present invention to provide a bidirectional filter assembly molded as one-piece.

It is a further object of the present invention to provide a bidirectional filter assembly in which contaminants are flushed from a screening material to allow for self-cleaning of the assembly.

SUMMARY OF THE INVENTION

To achieve the foregoing objects, the present invention is a filter assembly for filtering contaminants from first and second fluid sources. The filter assembly includes first and second portions having first and second apertures, respectively, extending therethrough. The filter assembly also includes a web portion for spacing longitudinally the first and second portions and having a third aperture extending therethrough for allowing fluid flow between the first and second apertures. The first and second portions include means forming a filter disposed in each of the first and second apertures for filtering contaminants from fluid flowing through the first and second apertures.

One advantage of the present invention is that the filter assembly is bidirectional for a pressure balanced piston and prevents the orifice in the piston from being plugged by contaminants in the transmission fluid. Another advantage of the present invention is that the filter assembly can be molded from plastic as a one-piece unit. Yet another advantage of the present invention is that the filter assembly can be used for other applications such as in filtering fluid from two separate sources. A further advantage of the present invention is that the filter assembly is self-cleaning because the change in direction of fluid flow will flush contaminants from the screening material.

Other objects, features and advantages of the present invention will become more fully apparent from the following description of the preferred embodiment, the appended claims and the accompanying drawings.

DESCRIPTION OF THE PREFERRED EMBODIMENT

Figures 1, 2, 3, 4:
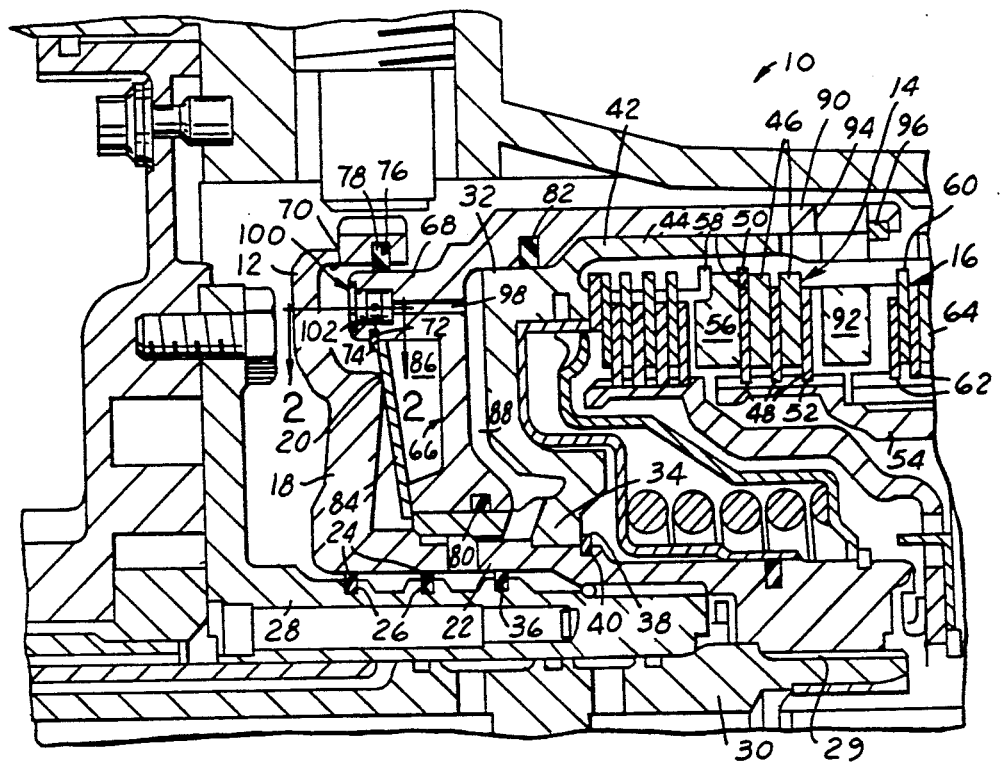
FIG. 1 is a fragmentary sectioned view of a portion of an automatic transmission incorporating the filter assembly according to the present invention.
FIG. 2 is a sectional view of the filter assembly taken along line 2—2 of FIG. 1.
FIG. 3 is a perspective view of the filter assembly of FIG. 1 with a portion thereof broken away.
FIG. 4 is an oblique view of the filter assembly of FIG. 1.

Referring to FIG. 1, an automatic transmission 10 is partially shown. The automatic transmission 10 may be of the type disclosed in copending application Ser. No. 188,610, filed Apr. 29, 1988, the disclosure of which is incorporated herein by reference.

The automatic transmission 10 includes an input clutch retainer hub 12 which is provided to house input clutch assemblies, generally indicated at 14 and 16. The input clutch retainer hub 12 has a generally radially extending portion 18 having a shoulder 20 and a generally axially extending portion 22. A plurality of spaced seal rings 24 are disposed in corresponding annular grooves 26 which are formed along a reaction shaft support 28. The input clutch retainer hub 12 is also splined at 29 to an input shaft 30.

An input clutch retainer 32 has a hub portion 34 disposed about and drivingly connected to, as by spline connection 36, to the axially extending portion 22 of the input clutch retainer hub 12. A tapered snap ring 38 is disposed in a groove 40 of the input clutch retainer hub 12 to prevent axial movement of the input clutch retainer 32 toward a gear assembly (not shown). The input clutch retainer 32 includes an axially extending flange 42 forming a cylinder. A plurality of circumferentially spaced clutch retainer fingers 44 extend radially inwardly from the flange 42 to which clutch plates are mounted.

The first clutch assembly 14 comprises a plurality of axially spaced annular clutch plates 46 and a plurality of axially spaced annular clutch disks 48. The clutch disks 48 are alternated between the clutch plates 46 and when the clutch assembly 14 is not applied, these plates 46 and disks 48 are free to move or rotate relative to each other. The clutch plates 46 have splines (not shown) on their outer diameter and mount in grooves 50 of the clutch retainer fingers 44 which are inside the input clutch retainer 22. The clutch disks 48 have internal splines (not shown) and are lined with friction material. The clutch disks 48 are mounted in grooves 52 in a clutch hub 54. An annular reaction plate 56 is secured to the inside of the input clutch retainer 32 axially on one side of the clutch assembly 14. Annular snap rings 58 are disposed on the sides of the reaction plate 56.

The second clutch assembly 16 comprises at least one annular clutch plate 60 and a plurality of axially spaced annular clutch disks 62. The second clutch plate 60 and clutch disks 62 are similar to those of the first clutch assembly 14. A second annular reaction plate 64 is mounted about one end of the clutch retainer fingers 44 of the input clutch retainer 32 on one side of the second clutch assembly 16. Selective snap rings (not shown) secure the reaction plate 64 from axial movement along the input clutch retainer 32.

To apply the first clutch assembly 14 and the second clutch assembly 16, a fluid actuating device such as a hydraulic piston, generally indicated at 66, has an axially extending projection 68 which operates in a bore or recess 70 of the input clutch retainer hub 12. The inner diameter of the projection 68 has a groove 72 provided for a snap ring 74 while the recess 70 of the input clutch retainer hub 12 has a groove 76 for a sealing means such as synthetic rubber seal ring 78. The hydraulic piston 66 is slidingly and sealingly mounted for axial movement on the outer diameter of the hub portion 34 of the input clutch retainer 32 through sealing means 80 at its inner periphery and near the outer periphery of the input clutch retainer 32 through sealing means 82. A double acting spring 84 such as a Bellville like spring is disposed in a first clutch cavity 86 between the hydraulic piston 66 and the input clutch retainer hub 12 to bias or return the hydraulic piston to its non-displaced or non-applied position shown in the Figure. A second clutch cavity 88 is formed between the hydraulic piston 66 and the input clutch retainer 82.

The hydraulic piston 66 includes an axially extending cylinder portion 90 which has an annular pressure plate member 92 secured at one end thereof by wave snap ring 94 and a flat snap ring 96. The pressure plate member 92 is interposed between the first clutch assembly 14 and second clutch assembly 16.

The hydraulic piston 66 includes at least one communication orifice 98. The communication orifice 98 communicates axially through the hydraulic piston 66. A filter assembly, generally indicated at 100, according to the present invention is disposed in an enlarged diameter end 102 of the communication orifice 98 to prevent plugging of the communication orifice 98 and allow bidirectional flow of the hydraulic fluid between the first and second clutch cavities 86 and 88.

Referring to FIGS. 2 through 4, the filter assembly 100 includes generally annular first or second or rear portions 104 and 106 interconnected by a generally rectangular web portion 108. The web portion 108 is oriented generally perpendicular to the front and rear portions 104 and 106 and longitudinally or axially spaces the front and rear portions 104 and 106. The front portion 104 includes a generally annular flange 110 extending radially outwardly at one end of the front portion 104. The flange 110 has a diameter greater than the diameter of the front portion 104. The flange 110 is disposed in a counter-bore 112 of the enlarged diameter end 102 to limit inward movement of the filter assembly 100 into the enlarged diameter end 102 of the communication orifice 98.

The flange 110 and front portion 104 include a generally semi-circular first or front aperture 114 extending therethrough. The front aperture 114 is disposed on one side of the web portion 108. The rear portion 106 includes a generally semi-circular second or rear aperture 116 extending therethrough on the other side of the web portion 108. The web portion 108 includes a generally circular filter orifice 118 extending therethrough to allow fluid flow between the front and rear apertures 114 and 116. The front and rear apertures 114 and 116 are generally equal in radius or width, which is also greater than the width or radius of the filter orifice 118.

The front and rear portions 104 and 106 also include a screen 120 and 122, respectively, disposed about the inner longitudinal end of the front and rear apertures 114 and 116. The screens 120 and 122 are secured to the front and rear portions 104 and 106 by means such as, when formed by conventional injection molding. The screens 120 and 122 filter or resist contaminants from entering the filter orifice 118. Preferably, the filter assembly 100 is made of a plastic material. The filter assembly 100 is typically formed by conventional injection molding. As a result, the filter assembly is a one-piece, molded and integral unit.

In operation, the hydraulic piston 66 is displaced axially by fluid pressure in the clutch apply cavities 86 and 88 for the application of either the second or first clutch assemblies 14 and 16, respectively. When that application is removed, the hydraulic piston 66 must return to its substantially centered or non-applied position. Due to the centrifugal force acting on the rotating fluid in either of the clutch apply cavities 86 and 88 which apply the hydraulic piston 66, an unbalanced pressure will exist and cause the hydraulic piston 66 to be biased and remain in that position even though the fluid apply line is vented. The communication orifice 98 acts as a means to allow fluid to pass through the hydraulic piston 66 due to this differential pressure and allows the hydraulic piston 66 to be centered by the spring 84 since any centrifugal fluid pressure in the clutch apply cavities 86 and 88 is balanced by comparable centrifugal fluid pressure on the opposite side when both clutch apply cavities 86 and 88 are filled.

For example, fluid flows from clutch apply cavity 86 through front aperture 114 and first screen 120 to filter orifice 118. Fluid flows through filter orifice 118 and second screen 122 and rear aperture 116 to communication orifice 98. Fluid flows through communication orifice 98 to clutch apply cavity 88. The flow sequence is reversed for fluid traveling from clutch apply cavity 88 to clutch apply cavity 86. The first screen 120 resists contaminants in the transmission fluid from entering communication orifice 98 from th clutch apply cavity 86. The second screen 122 resists contaminants in the transmission fluid from entering the filter orifice 118 from the clutch apply cavity 88. It should be appreciated that fluid flow from filter orifice 118 through either screen 120 or 122 will flush contaminants from the screening material to produce a self-cleaning action. It also should be appreciated that a filter assembly 100 could be disposed in the hydraulic piston 66 at both ends of the communication orifice 98.

Figure 5:
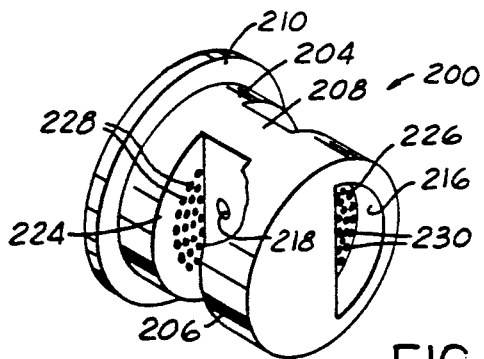
FIG. 5 is a first alternate embodiment of the filter assembly of FIG. 1 with a portion thereof broken away, all in accordance with the present invention.
Figure 6:
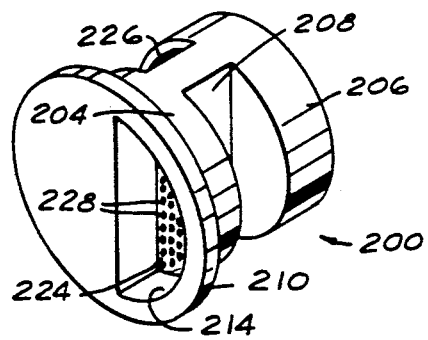
FIG. 6 is a perspective view of the first alternate embodiment of the filter assembly of FIG. 5 as viewed from the opposite direction of that shown in FIG. 5.
Figure 7:
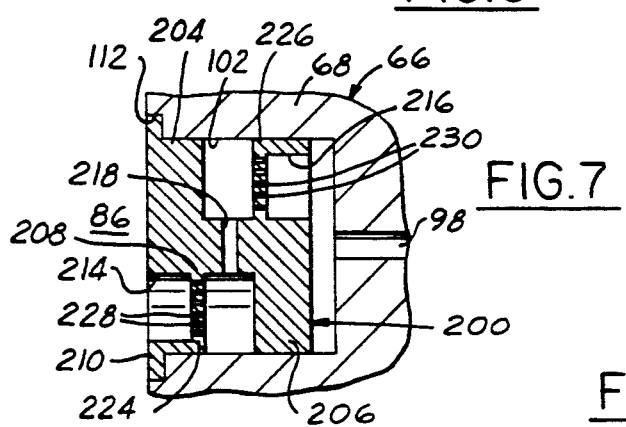
FIG. 7 is a sectional view similar to FIG. 2 incorporating the filter assembly of FIGS. 5 and 6.

Referring to FIGS. 5 through 7, an alternate embodiment 200 of the filter assembly 100 is shown. Like parts have like numerals increased by one hundred (100). In the filter assembly 200, the front and rear apertures 214 and 216 extend partially from an outer to an inner longitudinal end to form a first and second inner wall 224 and 226, respectively. The first and second inner walls 224 and 226 includes a plurality of longitudinally extending filter apertures 228 and 230, respectively, extending therethrough to form a screen or filter. The filter apertures 228 and 230 each have diameter less than the diameter of the front and rear apertures 214 and 216 and filter orifice 218, respectively. The operation of the filter assembly 200 is similar to the filter assembly 100, previously described.

Figure 8:
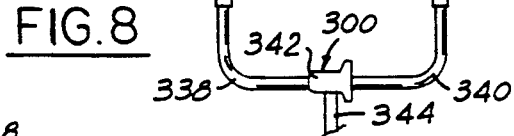
FIG. 8 is an elevational view of a second alternate embodiment of the filter assembly of FIG. 1 in accordance with the present invention.
Figure 9:
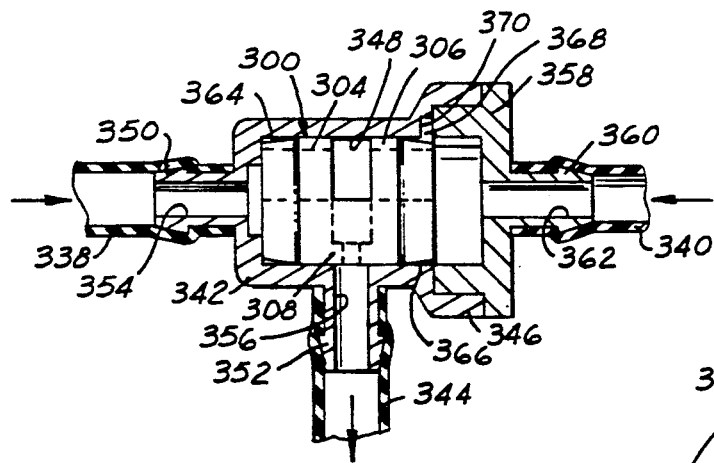
FIG. 9 is a fragmentary view of the second alternate embodiment of the filter assembly of FIG. 8.
Figure 10:
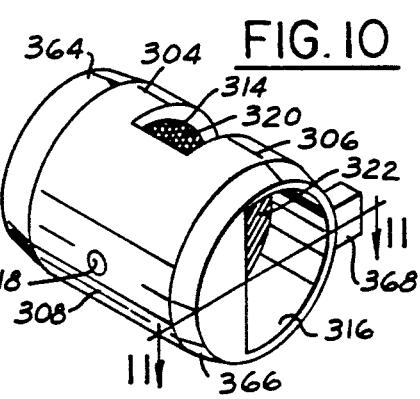
FIG. 10 is a perspective view of the second alternate embodiment of the filter assembly of FIG. 8.
Figure 11:
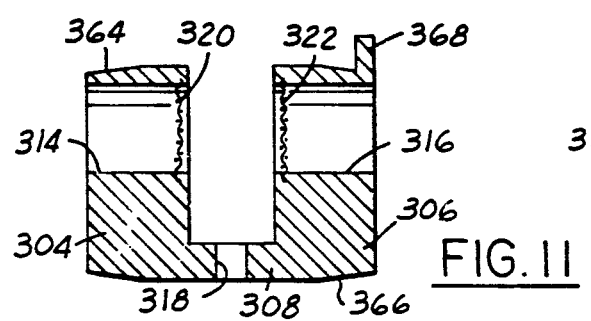
FIG. 11 is a sectional view taken along line 11—11 of FIG. 10.

Referring to FIGS. 8 and 9, a second alternate embodiment 300 of the filter assembly 100 is shown. Like parts have like numerals increased by two hundred (200). The filter assembly 300 is used in a medically related application. For example, a first and second bottle 332 and 334 containing a fluid therein are supported by a support stand 336 (partially shown). A first and second conduit 338 and 340 lead from the first and second bottles 332 and 334, respectively, to a housing 342 enclosing the filter assembly 300. A third conduit 344 leads from the housing 342 to be attached to a person to allow the fluid in the bottles 332 and 334 to enter the person.

The housing 342 includes a female member 346 having a pocket 348 formed therein. A first and second projection 350 and 352 extend from the female member and allow the first and third conduits 338 and 344 to be attached thereto. The first and second projections 350 and 352 include a passageway 354 and 356, respectively, extending therethrough to the pocket 348. The housing 342 includes a male member 358 to close an open end of the pocket 348. The male member 358 includes a third projection 360 extending outwardly to allow the second conduit 340 to be attached thereto. The third projection 360 includes a passageway 362 extending therethrough to the pocket 348 of the female member 346 as shown in the figure.

The filter assembly 300 is disposed within the pocket 348. The web portion 308 is generally arcuate having a concave inner surface and convex outer surface and is attached along one side of the front and rear portions 304 and 306. The front and rear apertures 314 and 316 are aligned with each other and include the screen 320 and 322 at their inner longitudinal ends. The front and rear portions 304 and 306 are beveled at 364 and 366 to facilitate insertion and removal from the pocket 348. The rear portion 306 includes a radial projection 368 adapted to be disposed in a corresponding recess 370 at one end of pocket 348 for locating the filter assembly 300 relative to the pocket 348.

In operation, fluid may flow from either bottle 332 or 334 and through conduit 338 and 340 to housing 342. Fluid from first conduit 338 flows through passageway 354 and front aperture 314. Fluid from front aperture 314 flows through screen 320 and filter orifice 318 and passageway 356 to third conduit 344. Similarly, fluid from second conduit 340 flows through passageway 362 and rear aperture 316. Fluid from rear aperture 316 flows through screen 322 and filter orifice 318 and passageway 356 to third conduit 344. The screens 320 and 322 resist contaminants in the fluid from entering filter orifice 318 and third conduit 344.

The present invention has been described in an illustrative manner. It is to be understood that the terminology which has been used is intended to be in the nature of words of description rather than of limitation.

Obviously, many modifications and variations of the present invention are possible in light of the above teachings. Therefore within the scope of the appended claims, the present invention may be practiced otherwise than as specifically described.

What is claimed is:

1. A filter assembly for filtering contaminants from first and second fluid sources, comprising:

generally planar front and rear surface portions having front and rear apertures, respectively, extending therethrough and defining first and second parallel planes;

a web portion defining a pair of generally parallel planar surfaces connected to and extending between said front and rear surface portions for spacing longitudinally said front and rear surface portions, said planar surfaces extending in a generally perpendicular relationship to said first and second planes, said front aperture being located adjacent one of the planar surfaces of said web portion and the rear aperture being located adjacent the other of the planar surfaces of said web portion, said web portion including a filter orifice extending therethrough and opening outwardly through said planar surfaces for allowing fluid flow therethrough from said front and rear apertures; and said front and rear apertures including means forming a filter disposed in each of said front and rear apertures for, filtering contaminants from fluid flowing through said front and rear apertures.

2. A filter assembly as set forth in claim 1 wherein said filter means comprises a screen.

3. A filter assembly as set forth in claim 2 wherein said front and rear portions are annular.

4. A filter assembly as set forth in claim 3, wherein said web portion is rectangular in cross section and orientated perpendicular to said first and second planes defined by said front and rear portions.

5. A filter assembly as set forth in claim 1 wherein said filter means comprises a plurality of filter apertures extending through a wall portion located at one end of said front and rear apertures.

6. A filter assembly as set forth in claim 1 wherein said front portion includes a radially outwardly extending flange.

7. A filter assembly as set forth in claim 6 wherein said front and rear apertures are semi-circular in shape.

8. A filter assembly as set forth in claim 7 wherein said screen is self-cleaning.

9. A filter assembly for filtering contaminants from first and second fluid sources, comprising:

generally planar front and rear surface portions having front and rear apertures, respectively, extending therethrough and defining first and second parallel planes;

an arcuate web portion defining a concave inner surface and a convex outer surface connected to and extending between said front and rear surface portions for spacing longitudinally said front and rear surface portions, said convex and concave surfaces extending in a generally perpendicular relationship to said first and second planes, said front and rear apertures being located adjacent said concave surface of said web portion, said web portion including a filter orifice extending therethrough and opening outwardly through said convex and concave surfaces for allowing fluid flow therethrough from said front and rear apertures; and said front and rear apertures including means forming a filter disposed in each of said front and rear apertures for filtering contaminants from fluid flowing through said front and rear apertures.

10. A rotatable fluid actuating device being movable axially to engage and disengage at least one clutch assembly in a transmission, comprising:

a piston member;

a communication orifice passing through the piston member to allow fluid to pass through the piston member to a cavity on either side of the piston member and develop centrifugal fluid pressure on that side of the piston member, thereby allowing the piston member to be returned by a spring to a non-engaged clutch position; and a one-piece molded filter assembly disposed in the communication orifice for filtering contaminants in the fluid to prevent plugging of the communication orifice by the contaminants, said filter assembly including generally planar front and rear surface portions having front and rear apertures, respectively, extending therethrough and defining first and second parallel planes;

a web portion for spacing longitudinally said front and rear surface portions and defining a pair of generally parallel planar surfaces connected to and extending in a generally perpendicular relationship to said first and second planes, said front aperture being located adjacent one of the planar surfaces of said web portion and the rear aperture being located adjacent the other of the planar surfaces of said web portions, said web portion having a filter orifice extending therethrough for allowing fluid flow therethrough from said front and rear apertures; and said front and rear apertures including means forming a filter disposed in each of said front and rear apertures for filtering contaminants from fluid flowing through said front and rear apertures.

11. A rotatable fluid actuating device as set forth in claim 10 wherein said filter means comprises a screen.

12. A rotatable fluid actuating device as set forth in claim 11 wherein said web portion is rectangular in cross section and orientated perpendicular to said first and second planes defined by the outer surfaces of said front and rear portions.

13. A rotatable fluid actuating device as set forth in claim 12 wherein said front and rear apertures are semi-circular in shape.

14. A rotatable fluid actuating device as set forth in claim 10 wherein said front and rear portions are annular.

15. A rotatable fluid actuating device as set forth in claim 14 wherein said front portion includes a radially outwardly extending flange.

* * * * *